2,952,270
NON-FREEZING BALL COCK VALVE

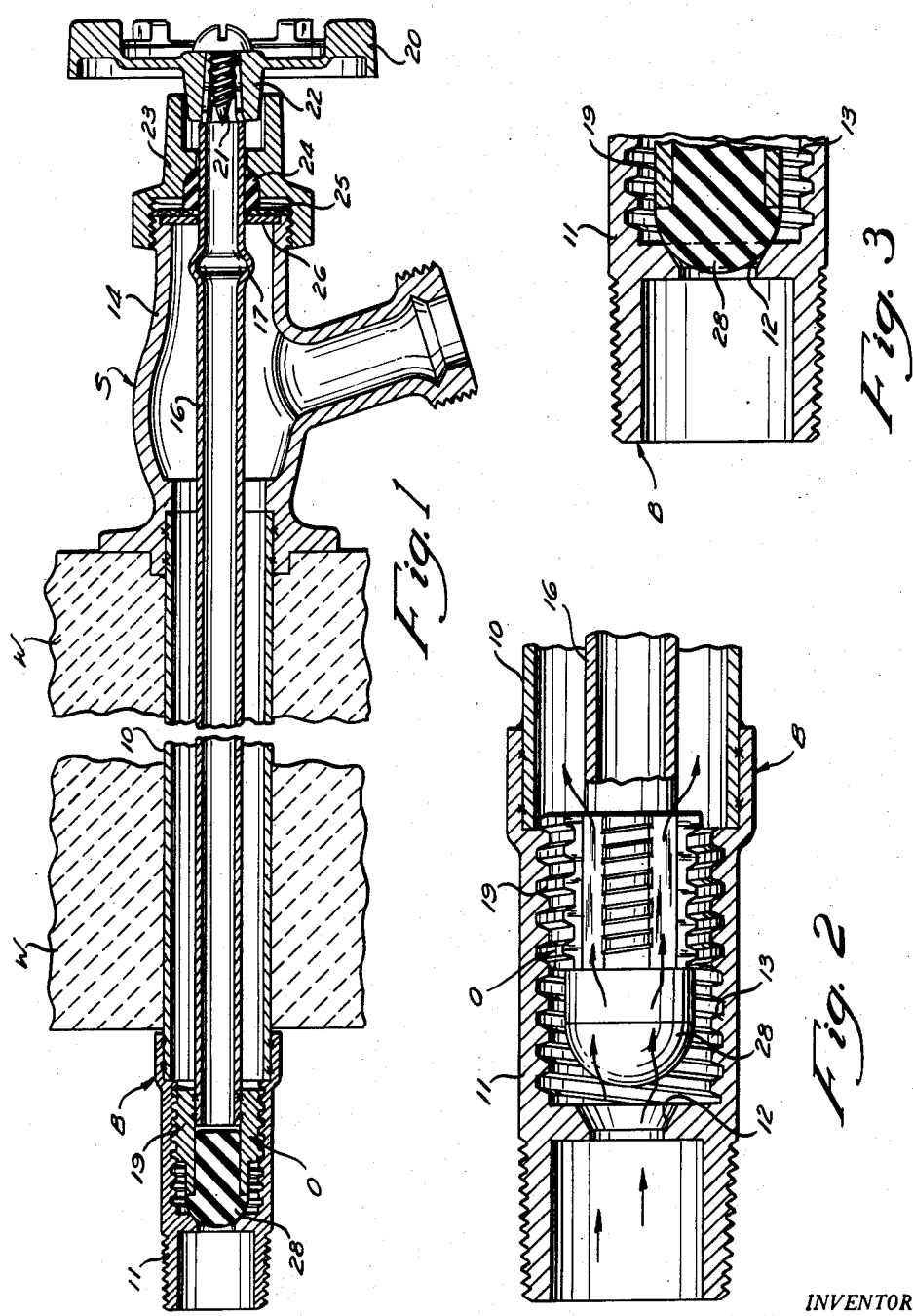

Howard A. Fulton and Ira Glenn Henry, Perrysville, and Laird I. Kerr, Big Prairie, Ohio, assignors to Mansfield Sanitary Inc., Big Prairie, Ohio, a corporation of Ohio Filed Aug. 6, 1958, Ser. No. 753,559

1 Claim. (Cl. 137—360)

The present invention relates generally to sillcock valves and is more particularly concerned with novel frost-proof valves of this type having important new advantages.

It is a primary objective of the present invention to provide a frost-proof sillcock which will have impact resistance, particularly as to the valve stem element, far superior to the prior devices of this type.

It is a further important object of this invention to provide a non-freezing sillcock which will have a maintenance-free service life many times longer than the most trouble-free prior valves of this type.

It is another object of this invention to provide such a non-freezing sillcock at manufacturing and installation costs less than prior commercial devices of this class.

Other and further objects and advantages of this invention will become apparent from the detailed description set forth below, reference being had to the drawings accompanying and forming a part of this specification in which:

Figure 1 is a longitudinal, sectional view of a sillcock embodying this invention in a preferred form and showing the relationship of the valve to a building wall structure in a typical installation;

Figure 2 is an enlarged fragmentary, longitudinal, sectional view of the valve of Figure 1, showing the inner end portion of the valve body including the valve seat and threads with the valve stem in operative engagement with the threads and the valve in open position, and Figure 3 is a view similar to Figure 2 showing the valve closed and the valve seat in substantially lineal but sealing contact with the valve seat.

Generally, a sillcock valve of this invention comprises the combination of a tubular valve stem which is open at its ends and provided with an integrally formed retaining ring near its outer end, a rubber valve member disposed in and closing the inner end of the hollow stem and liquid-sealingly engageable with the valve seat, an operating handle having a hollow shank receiving the outer end of the stem and a self-threading screw securing the handle and the stem together.

Specifically, in the illustrated embodiment of this invention sillcock S comprises an elongated, fabricated metal valve body B and valve operating assembly O disposed partly within body B and movable relative thereto.

Body B includes a central tube 10 to be disposed through a building wall W, as shown in Figure 1. An adaptor and valve seat element 11 receives the inner end of tube 10 and is welded thereto to constitute, in effect, an extension of the tube and thus locate valve seat 12 well within the building and away from the frost zone. Outer body member 14 is similarly telescopically related to tube 10 and welded to the outer end thereof to deliver water flowing through the adaptor and valve seat element and tube 10 to a location outside the building wall.

Assembly O includes a tubular metal valve stem 16 which is open at its ends and provided with an annular integral rib 17 near its outer end for a purpose subsequently to be described. A tubular screw-threaded member 19 forms a portion of the stem 16. The portion 19 is welded to the remainder of the stem 16 at its inner end. The threaded portion 19 of the stem 16 in normal use operatively engages threads 13. At its outer end valve stem 16 is connected to an operating handle 20 by means of a self-threading screw 21, handle 20 having a hollow shank 22 which is tapered for deformatively gripping engagement with the hollow valve stem.

A bonnet assembly closes the outer end of the valve body and seals or packs the valve stem. This assembly includes bonnet 23 which receives and is screwed on to the outer extremity of outer body member 14, packing in the form of rubber-like body 24 is disposed within bonnet 23, and washers 25 and 26 disposed between packing body 24, a circumferential rib 17 on the valve stem disposed to abut the washer 26 and arrest outward movement of the valve stem. Bonnet 23 has in addition an outer axial opening of enlarged diameter to receive shank 22 in telescoping relation, as illustrated in Figure 1.

It will be understood that the principal function of annular rib 17 of the valve stem is to retain washers 25 and 26 and packing body 24 in assembled relation on the stem when assembly O is not disposed within and connected to body B.

A rubber-like valve closure body 28 in the form of a plug having a hemispherical head portion to engage valve seat 12 is disposed within the inner end of stem end member 19. By virtue of the contour of head portion of body 28 and the conical contour of valve seat 12, it will be understood that initially in closing the valve an annular line contact is established between these two parts, and as pressure is applied urging the closure more tightly against the seat, this contact extends to an annular area. This fact and the resilient nature of body 28 assure good sealing results regardless of water pressures, and also assure a long trouble-free service. Body 28 is frictionally retained in member 19, and any tendency for body 28 to work its way out of the member 19 is effectively opposed by flow of water through the valve.

The member 19 is formed from splined stock (see Fig. 2) defining spaced longitudinal grooves and teeth to remove or wipe away any accumulated solids in the thread portion of the mating part, hence the threads are not subject to scoring and abrasion in ordinary use. In other words, the threads of the valve stem are self-cleaning and remove sediment in the cooperating threads of the body.

The illustrated sillcock, under test conditions substantially more severe than normal operating conditions, has proven to satisfy fully the objectives set out above. This sillcock, by comparison with the best in the prior art, is practically indestructible, remaining operative after more than seventy thousand opening and closing operations with no maintenance whatsoever. These results are attributable to the novel features and combinations of elements in this valve. Thus, the special self-cleaning thread feature precludes the ordinary thread break-down experienced in prior valves of this general type. The special nature of the valve stem assembly, and particularly the tubular construction of the stem proper, accounts for the unique resistance of this valve to impacts. The bonnet element and the new handle attachment construction, as well as the relationship between the closure body and member 19, all cooperate to enable the realization of the special economic advantage of these valves without off-setting sacrifice of ruggedness, ease of operation or operating efficiency of the device.

Having thus described this invention in such full, clear, concise and exact terms as to enable any person skilled in the art to which it pertains to make and use the same, and having set forth the best mode contemplated of carrying out this invention, we state that the subject matter which we regard as being our invention is particularly pointed out and distinctly claimed in what is claimed, it being understood that equivalents or modifications of, or substitutions for, parts of the above specifically described embodiment of the invention may be made without departing from the scope of the invention as set forth in what is claimed.

What is claimed is:

In a non-freezing sillcock valve comprising an elongated tubular body to extend through a wall and having a closed outer end to be disposed outside of the wall and an inner end to be disposed inside of the wall, said inner end being provided with interior threads and a valve seat, the combination of a valve stem within said tubular body and including a tube and a tubular member around and attached to the inner end of said tube, said tubular member having threads on its outer surface to engage with those on the inner surface of said tubular body and having circumferentially spaced passageways extending longitudinally of said tubular member and across the threads thereof, a deformable valve member having a cylindrical portion of reduced diameter extending into said threaded member and terminating adjacent to the inner end of said tube and frictionally retained in said member, said valve member having an annular portion of greater diameter overlying the inner end of said tubular member and having a curved surface to engage the said valve seat of the tubular body, a handle secured to the outer end of the valve stem to rotate the valve stem and move the deformable valve member toward and away from its seat, and packing around the valve stem adjacent to the outer end thereof.

References Cited in the file of this patent

UNITED STATES PATENTS

| | | |
|---|---|---|
| 723,832 | Cook | Mar. 31, 1903 |
| 1,070,453 | Griffin | Aug. 19, 1913 |
| 1,412,042 | Coar | Apr. 11, 1922 |
| 1,888,359 | Ritchie | Nov. 22, 1932 |
| 2,255,997 | Hanneman | Sept. 16, 1941 |
| 2,761,713 | Schulze | Sept. 4, 1956 |
| 2,808,069 | McCurdy | Oct. 1, 1957 |
| 2,810,395 | Simmons | Oct. 22, 1957 |